Nov. 25, 1969 P. FABERES ET AL 3,480,824
CONTROL DEVICES FOR DIRECT-VIEWING MEMORY TUBES
Filed Sept. 26, 1967

Inventor:
Pierre Faberes &
Georges Ribadier
by: Edwin E. Greigg

United States Patent Office 3,480,824 Patented Nov. 25, 1969

3,480,824
CONTROL DEVICES FOR DIRECT-VIEWING MEMORY TUBES

Pierre Faberes and Georges Ribadier, Paris, France, assignors to CSF-Compagnie Generale de Telegraphie Sans Fil, a corporation of France Filed Sept. 26, 1967, Ser. No. 670,668
Claims priority, application France, Oct. 4, 1966, 78,677
Int. Cl. H01j *29/46, 29/56*
U.S. Cl. 315—12 4 Claims

ABSTRACT OF THE DISCLOSURE

In a direct-viewing memory tube, the holding beam is modulated by a periodic signal; as a consequence an amplitude modulated wave at the frequency of this signal appears in the current of each of the electrodes of the secondary optical system. The amplitude detection of any one of those waves supplies a signal representative of the state of the storage layer.

The present invention relates to control devices for direct-viewing memory tubes.

Various devices are used to control the potential of an electrode of such tubes as a function of the state of the storage layer.

In particular, a control device of this type is used, with a view to prevent the deterioration of the electronic pattern inscribed on the storage layer, and that of the luminescent screen itself, as a consequence of excessively bright illumination when the pattern inscribed on the storage layer becomes excessively positive, following the inscription thereon, with a high repetition rate, of a signal to be observed. So-called erasing pulses are then used to control the potential of an electrode of the tube, in order to facilitate the capture, by the storage layer, of electrons of the holding beam, the number and/or duration of the erasing pulses being made dependent upon the state of the storage layer.

In order to achieve a control as a function of the state of the storage layer, it has been proposed to measure the current supplied by the very high voltage source feeding the luminescent screen. The intensity of this current is related to the illumination of the screen and therefore to the state of the storage layer.

However, it is difficult to discriminate between the variation of this current due to the state of the storage layer, and its variation due to other factors and this method leads to comparatively complex circuits for tubes such as the tube F-8006 (of the catalogue "Tubes electroniques CSF"). Moreover, this method becomes practically useless for more recent direct-viewing memory tubes, such as tube F-8055 of the aforementioned catalogue, for which the current of the very high voltage source is a hundred times less, this making it necessary to measure direct currents of the order of 10 nanoamperes.

The present invention has the object of removing these drawbacks.

According to the invention, there is provided a control device for automatically controlling the potential of an electrode of a direct-viewing memory tube including a storage layer, as a function of the state of said storage layer, said tube comprising a writing gun for supplying a writing beam, a holding gun for supplying a holding beam, and a plurality of electrodes including at least three electrodes forming the so-called secondary optical system, namely a viewing screen, a storage electrode comprising a mesh covered with said storage layer, and a collector grid, said control device including: first means, having an input, coupled to one of said electrodes of said secondary optical system for deriving from the current thereof a signal depending upon the state of said storage layer, and an output; and second means, having an input coupled to said output of said second means, for applying to one of said electrodes of tube a control signal, which is a function of said signal depending upon the state of said storage layer.

Said control device further comprising third means for applying to said holding gun a periodic signal, for modulating the intensity of said holding beam, and said first means being detecting means for detecting the amplitude of the amplitude modulated wave, at the frequency of said modulating signal, which is included in said current.

It will be noted that it has already been proposed to modulate the intensity of the holding beam by means of a modulating signal with a view towards reducing the production of positive ions, due to the ionization, by the electrons of the holding beam, of the atoms of the residual gas of the tube.

The gist of the present invention resides in the use, in a control device of the above type, of means for modulating the intensity of the holding beam with a periodic signal, and in the association therewith of detecting means for detecting the amplitude of the amplitude-modulated wave, at the frequency the periodic signal, thus appearing in the current of any one of the electrodes of the secondary optical system. Preferably, these detecting means are synchronous detecting means.

The invention will be further explained, and other features will become apparent from the following description with reference to the accompanying drawings, in which:

FIG. 1 shows, merely by way of example, the diagram of a direct-viewing memory tube 1 of the type F-8055. It comprises mainly:

Figure 1:
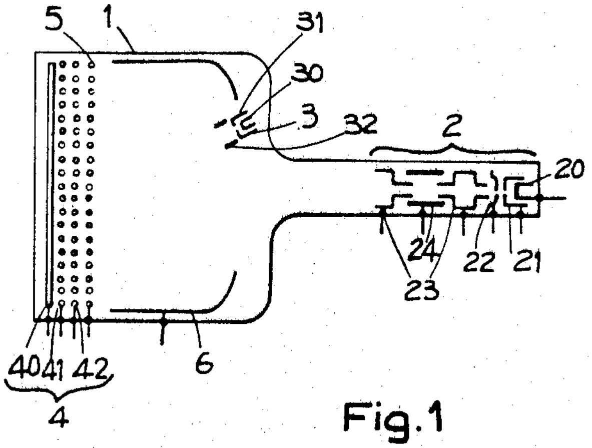
FIG. 1 shows diagrammatically a direct-viewing memory tube of known type.

An axial writing gun 2, emitting fast electrons and comprising a cathode 20, a Wehnelt 21, a control anode 22, accelerating anodes 23 and a focusing anode 24. The beam deflecting means are not shown.

A holding gun 3, formed by four parallel-connected elementary guns, emitting slow electrons; each of the elementary guns (only one of which is shown in the figure) comprises a cathode 30, a Wehnelt 31 and an anode 32.

A collimating anode 6 associated with the holding gun.

A so-called "secondary" optical system 4, comprising three electrodes: the luminescent screen 40, the storage electrode 41 comprising a metallic mesh covered with an insulating storage layer with secondary emission, and the collector grid 42.

A supplementary grid 5, ensuring the uniform distribution of the electrons of the holding beam over the entire transverse surface of the tube.

The mode of operation of such a tube is well known, and will not be described here.

However, the phenomenon already mentioned hereinabove, namely the deterioration of the electronic pattern inscribed on the storage layer, when signals with a high inscription rate are analysed, will be again considered. In such a case, there appears an excessive rise of the voltage in the vicinity of the electronic pattern, and from this results a strong secondary emission of negative charges near the electronic pattern which tends to thicken, and this, in turn, leads to a thickening and to an excessive brightness of the optical pattern displayed on the viewing screen.

In order to remedy this drawback, it is necessary to apply, either to the mesh of the storage electrode 41 or to the cathode 30, erasing pulses, whose number and/or duration must be made dependent upon the state of the storage layer. Those pulses cause the storage mesh to become sufficiently positive relatively to the cathode 30 for the storage layer to be recharged uniformly at a potential near that of the cathode 30 through the capture of electrons from the holding beam.

Figure 2:
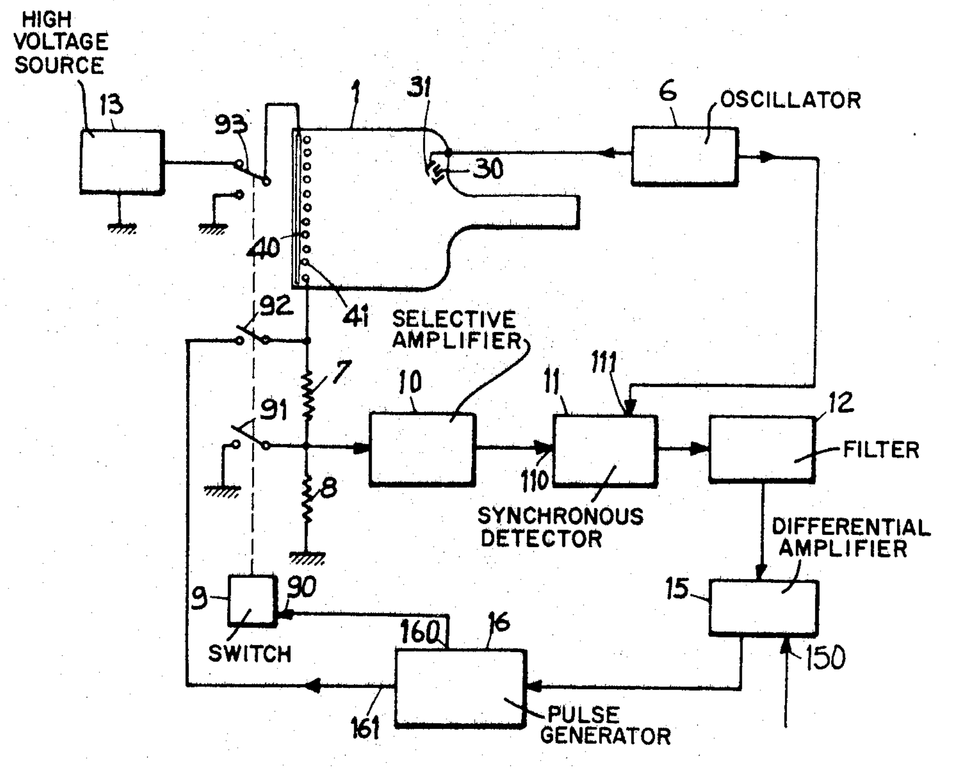
FIG. 2 is a diagram of the control device according to the invention, as applied to the tube of FIG. 1.

The improvement according to the invention is, in particular, advantageously used to prevent this phenomenon of the deterioration of the electron pattern, by means of a circuit as shown in FIG. 2. This figure shows again the memory tube 1. Only the electrodes of this tube which are necessary for explaining the invention are shown here.

The intensity of the holding beam is modulated by means of an oscillator 6, for example, with a frequency of 20 kc./s., connected to the Wehnelt 31 of the holding gun. The storage mesh of electrode 41 is connected to earth through two resistors 7 and 8 connected in series.

The junction of the resistors 7 and 8 is connected to the input of an amplifier 10 whose output is connected to the input 110 of a synchronous detector 11, the input 111 of which is connected to the oscillator 6. The output of the detector 11 is connected to a filter circuit 12 which is, in turn, connected to a first input of a D.C. differential amplifier 15, whose other input 150 receives an adjustable D.C. reference voltage. The output of the amplifier 15 is connected to the control input of a generator 16 supplying the erasing pulses. A switch 9, having a control input 90 connected to another output 160 of the pulse generator 16 is provided with three moving contacts 91, 92 and 93. In their first "resting position" shown in the figure, contacts 91 and 92 do not play any part, and contact 93 connects the viewing screen to the high voltage source 13, whereas, when the moving contacts are in their second position, contacts 91 and 93 respectively connect to earth the viewing screen and the junction point of resistors 7 and 8, and contact 92 connects the storage mesh of electrode 41 to the output 161 of the pulse generator 16.

The operation is as follows:

The electrons of the holding beam are distributed amongst the collector grid which collects the electrons repelled by the storage layer, the viewing screen which captures the electrons passing through the storage layer, and the storage electrode itself which does not have an infinite transparency.

The modulation in the intensity of the holding beam causes the appearance, in the current of each of the three electrodes of the secondary optical system, of a wave at the frequency of the signal modulating the holding beam. Any variation in the potential of the storage layer causes a change in the distribution of the electrons amongst the three electrodes and consequently an amplitude-modulation of each of the above-mentioned waves, which will be referred to hereinafter as the "indicator waves."

The experiments of the applicant have confirmed that from the amplitude detection of any one of said waves a detected signal resulted, which was satisfactorily representative of the state of the storage layer.

In addition, the use of such a wave for the obtention of the signal representative of the state of the storage layer allows an easy amplification and the use of the selective circuits.

On the other hand the modulation of the holding beam has no appreciable effect on the brightness, erasing and inscribing characteristics on the tube, and has the advantage of reducing also the production of positive ions caused by ionization of residual atoms in the envelope of the tube by the electrons of the holding beam.

In the assembly shown in FIG. 2, the storage electrode current is used, which means that the amplitude of the indicator wave included in this current varies in the same direction as the potential of the storage layer, i.e. the amplitude of the wave increases when the potential of the storage layer rises. A voltage proportional to the storage electrode current is taken from the terminals of the resistor 8 and the indicator wave included therein is amplified in the selective amplifier 10. The amplified wave undergoes in the synchronous demodulator 11, a synchronous demodulation, the reference wave being applied to the input 111 by the oscillator 6. This synchronous demodulation makes it possible to eliminate all parasitic signals, especially those due to the modulation of the high voltage of the screen, which will be discussed below. The filter 12 supplies the corresponding detected signal. The corresponding D.C. voltage, which is proportional to the amplitude of the indicator wave is applied to the differential amplifier 15. The adjustment of the reference voltage applied to the input 150 makes it possible to control easily the threshold of the detected signal above which the erasing pulse generator is triggered off.

When the output current of the filter 12 exceeds this threshold, the generator 16 supplies at its output 161 an erasing pulse with an amplitude which is adjustable as a function of the inscription and erasing characteristics of the tube. Generator 16 is of the known type supplying a pulse whose duration depends upon the amplitude of its triggering signal. The duration, of the pulse is thus determined by the difference between the voltages applied to the two inputs of the amplifier 15. At the same time, the generator 16 supplies at its output 160, a control pulse of the same duration which brings the moving contacts 91, 92 and 93 to their second position. During the duration of each control pulse, the input of the amplifier 10 is therefore grounded and the erasing pulse is applied between the terminals of the resistor 7, while the high voltage supply of the screen is cut off by means of the moving contact 93, in order to avoid a blinding of the viewer which may otherwise take place when the erasing pulses are applied to the storage mesh.

Of course, switch 90, represented for clarity's sake as an electromechanical switch with three moving contacts is advantageously substituted by three electronic switches controlled by the same control pulses.

On the other hand, it will be noted that the invention is not limited to the described example. In particular the first input of the synchronous detecting means may be coupled to any electrode of the secondary optical system taking of course into account the characteristic law according to which the indicator wave included in the corresponding current varies as a function of the state of the storage layer. Also the output signal of the synchronous detecting means may be used to other ends; if amplifier 15 is retained in the control circuit, a great versatility is obtained through applying to input 150 thereof a reference voltage varying according to any desired law.

The synchronous detecting means comprising the detector 11 and its output filter 12 may be, but less advantageously, substituted by a conventional amplitude detector, in which case of course no reference wave is used.

What is claimed is:

1. A control device for automatically controlling the potential of an electrode of a direct-viewing memory tube including a storage layer, as a function of the state of said storage layer, said tube comprising a writing gun for supplying a writing beam, a holding gun for supplying a holding beam, and a plurality of electrodes including at least three electrodes forming the so-called secondary optical system, namely a viewing screen, a storage electrode comprising a mesh covered with said storage layer, and a collector grid, said control device including: first means, having an input coupled to one of said electrodes of said secondary optical system, for deriving from the current thereof a signal depending upon the state of said storage layer, and an output, and second means, having an input coupled to said output of said first means, for applying to one of said electrodes of said tube a control signal, which is a function of said signal depending upon the state of said storage layer:

said control device further comprising third means for applying to said holding gun a periodic signal, for modulating the intensity of said holding beam, and said first means being detecting means for detecting the amplitude of the amplitude modulated wave, at the frequency of said modulating signal, which is included in said current.

2. A control device as claimed in claim 1, wherein said detecting means are synchronous detecting means, and having a further input for receiving said periodic signal.

3. A control device as claimed in claim 2, wherein said one electrode of said secondary optical system is said storage electrode, and wherein said second means comprise: a differential amplifier having a first input coupled to said output of said synchronous detecting means, a second input and an output; means for applying a reference voltage to said second input of said differential amplifier; a pulse generator, for generating erasing pulses, having a further input coupled to said differential amplifier output, and an output; and further means for applying said erasing pulses to said storage electrode.

4. A control device as claimed in claim 3, wherein said further means comprise switching means, controlled by said pulse generator, for coupling said output of said pulse generator to said storage electrode, disconnecting said detecting means from said storage electrode, and disconnecting said voltage source from said viewing screen for the duration of discrete time intervals substantially corresponding to the duration of said erasing pulses.

References Cited

UNITED STATES PATENTS

| | | | |
|---|---|---|---|
| 3,003,110 | 10/1961 | Toulemonde | 315—12 XR |
| 3,094,644 | 6/1963 | Buckbee et al. | 315—12 |
| 3,356,878 | 12/1967 | Yaggy et al. | 315—12 XR |

RODNEY D. BENNETT, Jr., Primary Examiner

JEFFREY P. MORRIS, Assistant Examiner